United States Patent Office 2,956,163
Patented Oct. 11, 1960

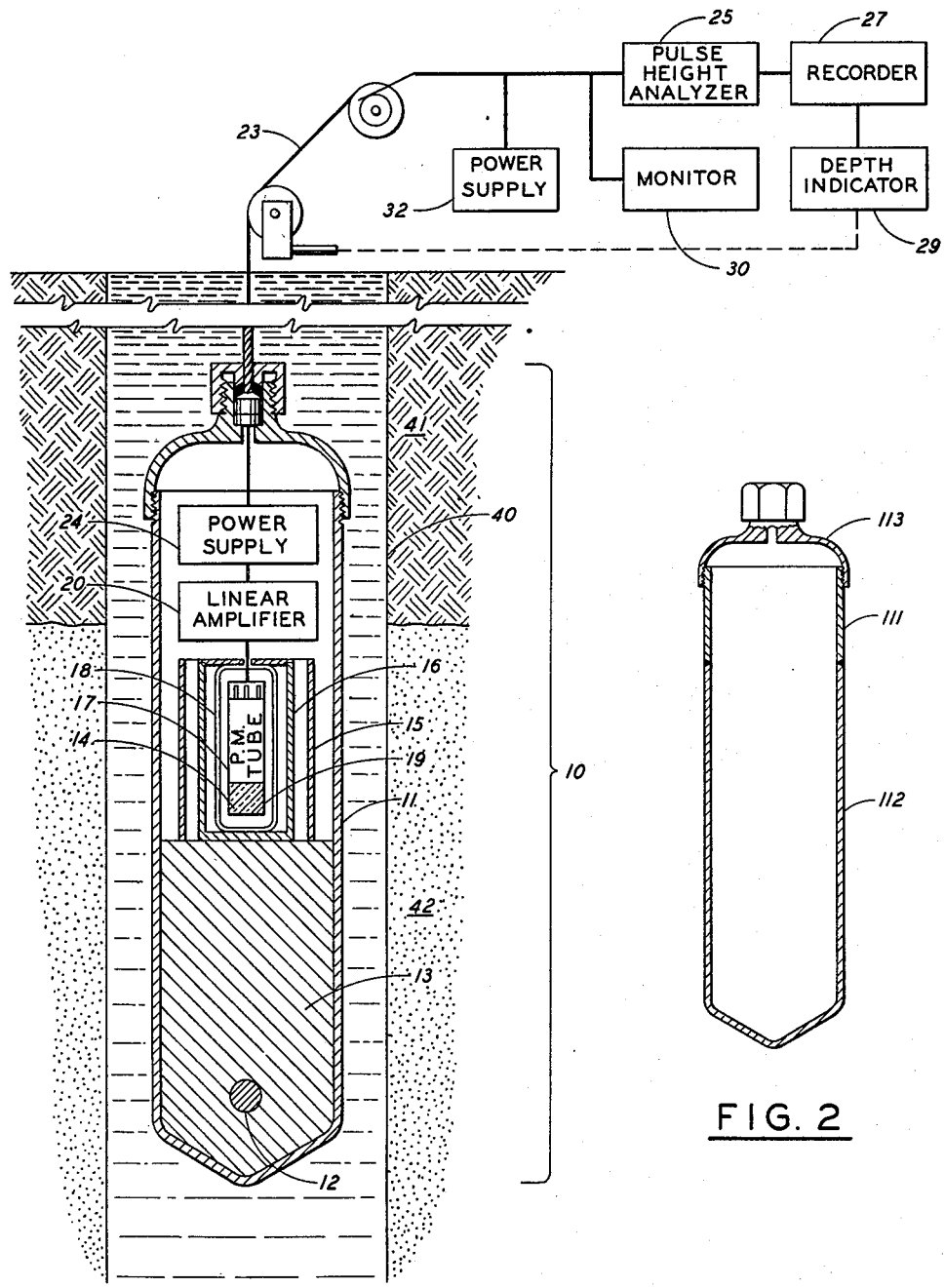

2,956,163

NUCLEAR SPECTROSCOPY WELL LOGGING SONDE

Paul E. Baker, Anaheim, Calif., assignor to California Research Corporation, San Francisco, Calif., a corporation of Delaware Filed Nov. 4, 1955, Ser. No. 544,956

4 Claims. (Cl. 250—71.5)

This invention relates to well logging by the measurement of neutron-capture gamma radiation, and in particular relates to an improved apparatus for detecting and recording a neutron-capture gamma ray spectrum that may be utilized to identify and evaluate more accurately the presence and proportions of elements in an earth formation traversed by the well bore.

The present invention has for a particular object the provision of an improved apparatus for determining the unknown constituent elements of an earth formation traversed by a well bore which comprises a source of neutrons for irradiating the earth formation, and a gamma ray energy detector vertically spaced from the source and housed together in a sonde constructed of a material having an especially small thermal neutron-capture cross-section and an especially high ratio of tensile and compressive strengths to density.

In a preferred form of apparatus for carrying out the present invention a source of neutrons, such as a polonium-beryllium neutron source, is positioned in a logging sonde and shielded with bismuth to provide essentially pure neutron irradiation to an earth formation traversed by a well bore whose unknown constituent elements are to be identified. A detector, such as a scintillation phosphor of sodium iodide activated with thallium, is located a predetermined distance from the source and shielded by bismuth both from gamma rays originating within the source and from low-energy gamma rays scattered by the formation. The detector is additionally shielded by a material, such as boron, having a large neutron-capture cross-section and giving only a low-energy gamma ray as the result of neutron capture, thereby preventing thermal neutrons diffused in the formation from reaching the detector. Means are provided for measuring and recording the energy spectrum of individual neutron-capture gamma rays instantaneously emitted by nuclei of elements in excited states within the earth formation due to capture of neutrons from said source. The source, detector, shielding and energy-measuring assembly are housed in a sonde having high structural strength but a small thermal neutron-capture cross-section, such as aluminum or magnesium.

Ordinarily, logging sondes are enclosed in a housing made of iron or steel, the wall thickness of the housing being usually ¼ to ½ inch. This amount of iron in the vicinity of a neutron source and a detector in a nuclear spectroscopy logging device has two serious ill effects. One is that the gamma rays coming from the formation are absorbed and scattered in passing through the steel wall. The other effect, which is even more serious, is the production of neutron-capture gamma rays in the iron of the housing. Iron has a high neutron-capture cross-section (2.4 barns for thermal neutrons) and emits intense neutron-capture gamma rays. The housing, moreover, in the vicinity of the source and detector, is in a favorable position to produce gamma rays which enter the detector. The presence of these gamma rays of iron arising from the housing is undesirable for two reasons. One is that it interferes with the spectrum from the formation, making all spectral lines more difficult to resolve. The other is that gamma rays from iron in the formation are completely masked by the gamma rays from the iron of the sonde housing. Thus it is difficult, and frequently impossible, to detect the presence of iron in a formation. Such detection is important in the geological interpretation of a nuclear spectroscopy log.

This invention involves broadly an improved combination of well logging apparatus comprising a neutron source and a gamma-responsive scintillation counter including a phosphor and photomultiplier shielded therebetween and housed in materials that assist the resolution of characteristic gamma ray energies and particularly gamma rays generated by iron nuclei in the earth formation.

Further objects and advantages will be apparent from the following description and from the attached drawings, which form a part of this specification.

In the drawings:

Fig. 1 is a schematic drawing of a preferred form of subsurface neutron-capture gamma ray logging sonde, including signal transmitting means for recording a gamma ray spectrum at the earth's surface.

Fig. 2 is a schematic representation of an alternative form of logging sonde particularly adapted to detect and measure neutron-capture gamma rays.

It should be remembered in connection with the following description that for low gamma ray energies, the photoelectric effect predominates in interactions of gamma radiation with phosphors. At medium gamma ray energies, the Compton effect becomes important, and at high energies the pair-production effect predominates. In the detection of a neutron-capture gamma ray, that is, a gamma ray emitted by the nucleus of an element in an excited state produced by capture of a thermal neutron, the pair-production effect constitutes an important fraction of the total number of events occurring in the detector if the detector consists of a material such as sodium iodide with an effective atomic number in the medium to high range of values. Neutron-capture gamma rays normally have high energies of from about 2 to 10 million electron volts (mev.), and it is the measurement of these high energies, including those arising from elemental iron, to which the present invention is particularly directed.

In the identification of constituent elements of an earth formation traversed by a well bore by the detection of these high-energy neutron-capture gamma rays, it has been found that extraneous low-energy gamma rays, that originate in several ways and exist in considerable number, are particularly susceptible to Compton scattering and photoelectric absorption. When these low-energy gamma rays are effectively screened or excluded from the detecting device, improved resolution of the measuring instruments is obtained. This improved resolution aids identification of the source elements of higher energy gamma rays by measurement of their characteristic energies. When neutron-capture gamma rays are produced by conversion of a nucleus of a constituent element in the earth formation to a higher mass number by neutron capture, the instantaneously emitted high-energy gamma rays are directly indicative of the constituent element which produced the excited nucleus, and such high-energy gamma rays frequently produce an electron-positron pair, otherwise known as pair-production, in the detector.

It will further be remembered that, upon the creation of an electron-positron pair by a high-energy gamma ray and upon annihilation of the positron, there are produced two annihilation quanta, each having an energy of substantially one-half mev. These annihilation quanta may both escape from the detector, or only one of the two may escape, or neither may escape. Accordingly, each such neutron-capture gamma ray from a particular excited nucleus may surrender its total energy to the detector, or the total energy minus substantially one-half mev., or the total energy minus substantially one mev. In neutron-capture gamma ray spectroscopy, these energy peaks are utilized to identify the gamma ray emitting nuclei within an unknown earth formation. Such peaks in the spectrum are produced by only a few more gamma rays of a particular energy being detected in the presence of a large number of gamma rays that have been Compton-scattered by material between the originating formation and the detecting crystal.

In preserving and accenting these few characteristic gamma ray energies, generated by the pair-production effect, there is provided in accordance with the present invention a combination of a neutron source and energy detecting scintillometer arranged in a particular combination of shielding and supporting materials. There is shown schematically in Fig. 1 a preferred arrangement of a well logging sonde and the shielding materials interposed between the neutron source and the neutron-capture gamma ray energy spectrometer. As there seen, well logging sonde 10 includes a side wall member 11 constructed of a material having a small thermal neutron-capture cross-section and preferably is selected from the group, which includes structural aluminum and magnesium. These materials are selected so that the interior of the sonde may be strong enough to withstand the pressures of several hundred pounds per square inch encountered at depth in wells. These materials are furthermore selected to withstand these pressures when at elevated temperatures, frequently in the vicinity of 300° F. As mentioned above, the housing material must also have a low neutron-capture cross-section so as not to produce neutron-capture gamma rays that interfere with detection and analysis of the spectrum from the formation, and must have the lightest possible weight in order to minimize absorption and scattering of gamma rays from the formation. Two materials that are particularly suitable for sonde housing on the basis of these requirements are aluminum and magnesium.

Aluminum and magnesium both have low neutron-capture cross-sections. The thermal neutron-capture cross-section of aluminum is 0.2 barn and the emission probability of its neutron-capture gamma rays is low so that it does not produce any high intensity gamma ray as a result of neutron capture. Magnesium has an even lower capture cross-section. Its thermal neutron-capture cross-section is 0.06 barn. Magnesium then will not capture enough neutrons to produce intense gamma radiation. Both aluminum and magnesium in their structural alloy forms have sufficient strength to serve as sonde housings. The small amount of impurities added to the pure metals to make the structural alloy is not sufficient to affect the operation of the log. Magnesium will usually be the preferred material, but in areas where limestone ($CaCO_3$) and dolomite ($CaMg(CO_3)_2$) are common formation rock types the aluminum housing will be preferred in order to permit the possibility of identifying magnesium in the formation. In areas where the formations are predominantly sandstone and shale the magnesium housing will be preferred in order to permit the identification of aluminum in the shales of the formation.

Further in accordance with the present invention, and in the preferred form of apparatus for logging neutron-capture gamma rays as shown in Fig. 1, a source of fast neutrons 12 in the form of a capsule of polonium-beryllium is encased in a shield 13 within housing 10. Shield 13 is constructed from material selected particularly to attenuate gamma rays emitted by the fast neutron source 12. Additionally, this material of shield 13 is constituted so that its own nuclei produce few high-energy neutron-capture gamma rays. In the preferred form of apparatus, this shield 13 is desirably constructed of bismuth which has a very small thermal neutron-capture cross-section, so that few neutron-capture gamma rays are produced within the shield material itself.

By providing a housing wall 10 as specified above, and a shield of bismuth, within which neutron source 12 is positioned, the formation whose constituents are to be identified is to a high degree shielded from gamma rays originating within the source or generated in the material between the source and formation. This feature is of particular importance since all known neutron sources generate gamma rays in addition to neutrons. For example, gamma rays are generated by a source such as radium-beryllium at a rate of the order of 25,000 gamma rays for each neutron emitted by the source, and even polonium-beryllium emits about 25 gamma rays for each neutron. The gamma rays originating within the source would result, without shield 13, in a very large number of gamma rays traveling directly into the detector 14 from source 12. These difficulties are obviated by shield 13 absorbing a large number of gamma rays that would otherwise interfere with the desired signal in the detector.

It will be noted that source 12 is positioned substantially adjacent to detector 14, thus making the problem of shielding even more critical with respect to directly-incident gamma rays. This positioning of detector 14 adjacent both the formation and source 12 is dictated by the maximum diffusion distance of both the fast neutrons produced by source 12 and the resulting thermal neutrons which produce the desired neutron-capture gamma rays. Additionally, the close spacing between source 12 and detector 14 is required for the detection of neutron-capture gamma rays since this type of gamma ray is emitted instantaneously by an excited nucleus after capture of a thermal neutron. This species of gamma ray is not emitted after a short-time delay, such as a time long enough to permit a detector to be moved into position adjacent a formation after the nucleus has been excited by neutron capture.

It is further essential, as mentioned before, that neither shield 13 nor housing 11 themselves produce numerous high energy neutron-capture gamma rays. For this reason, bismuth is an ideal material as the shield, since it likewise has a small capture cross-section for neutrons, relative to that of the vast majority of the elements under investigation.

As stated hereinbefore, the neutron-capture gamma rays that are particularly indicative of the constituents of an unknown earth formation are in general of high energy; that is, from about 2 to 10 mev. Accordingly, it is desirable to shield the detector 14 additionally from multitudinous gamma rays of substantially lower energies back-scattered to the detector in spite of source shield 13. For the reasons described above, and to eliminate neutron-capture gamma rays that have suffered multiple-scattering after emission by the excited nuclei in the formation, an additional shield 15, also constructed of bismuth, or similar material, surrounds detector 14. Shield 15 is desirably a thin cylindrical shell of about ⅛-inch thickness surrounding the detector.

A second shield 16 is provided substantially surrounding crystal 14, photomultiplier tube 17, and thermal insulator 18, which is desirably an evacuated flask to reduce thermal pulses from tube 17 under high temperature conditions. Shield 16 is desirably constructed of boron, and, more particularly, may be compounded of boron carbide, which has a large neutron-capture cross-section producing only low-energy gamma rays. Shield 16 thus provides shielding for detector 14 against thermal neutrons diffused in the formation as a result of the slowing down of the fast neutrons emitted by source 12. In this manner, thermal neutrons are to a high degree prevented from producing within the detector material itself high-energy neutron-capture gamma rays or other interactions with crystal 14.

Detector 14 in the arrangement of Fig. 1 is desirably a crystal of relatively dense material. One suitable material is a crystal of sodium iodide activated by thallium. Detector 14 is preferably surrounded by a light reflector 19, such as an aluminum shell, coated internally with a layer of magnesium oxide, capable of reflecting substantially all light developed in the crystal when a gamma ray reacts therewith to produce a scintillation.

As embodied in the arrangement of Fig. 1, photomultiplier tube 17 is connected to a single pulse linear amplifier 20. The output of amplifier 20 appears as an electrical pulse corresponding in magnitude or amplitude to the energy of each incoming neutron-capture gamma ray. These pulses may be transmitted through cable 23 to a differential pulse height analyzer, identified generally as 25. Pulse height analyzer 25 is arranged to discriminate and record a plurality of channels of the incoming pulses which are then transmitted to a recorder 27. The individual pulse height characteristic of the energy of individual gamma rays produced by neutron-capture may be displayed on recorder 27 in accordance with the depth of the logging sonde as measured by the depth indicator 29. As indicated, the logging sonde may be provided with a power supply 24 and a surface power supply, indicated generally as 32.

A monitoring unit 30, which may comprise a cathode ray oscilloscope, may be connected directly to the logging sonde through the logging cable and ahead of the pulse height analyzer 25. Monitoring unit 30 may be viewed directly and, if desired, the screen photographed in relationship to the depth of the logging sonde in the well bore. Such direct observation of the incoming pulses will appear as spectral traces of varying amplitude with the location and intensity of each line dependent upon the quantity of a particular gamma ray emitted by excited nuclei of a particular element. Thus, the intensity of the line is directly indicative of the quantity of a constituent element in the formation.

While the sonde housing 10 can be made entirely of aluminum or entirely of magnesium, as illustrated in Fig. 1, it may be partly made of iron, with that portion of side wall 11 in the vicinity of the detector being made of aluminum or magnesium. This latter construction is illustrated in Fig. 2, where logging sonde housing 10 is made in two sections, with the upper part 111 and cap 113 being made of steel, while the lower part 112 is made of a lighter metal, such as aluminum or magnesium.

In operation, the well sonde 10 is traversed through the well bore at a desired rate, depending upon the type of formations, such as 41 or 42, encountered, and the magnitude of the fast neutron flux emitted by capsule 12, as well as the sensitivity or gamma-responsive characteristic of the detector 14. The effect of fast neutron impingment upon the formations is well known in general to those skilled in this art. As discussed above, the effect that is particularly used in this invention is the simultaneous gamma ray emission by neutron-bombarded elements when nuclei of constituent elements of the formation capture thermal neutrons. Such thermal neutrons result from interaction of fast neutrons from source 12 with the hydrogen nuclei, primarily protons, in the fluids of the bore hole and within the pore spaces of formations 41 and 42. The ratio of thermal neutrons to fast neutrons is essentially unity under such conditions.

In conclusion, it will be appreciated that this invention comprehends broadly an improved apparatus for nuclear spectroscopy well logging, and particularly neutron-capture gamma radiation well logging, characterized by the combination of a source of neutrons and a scintillation counter spaced apart a predetermined distance in a housing and shield made of materials having low neutron-capture cross-sections with the detector additionally shielded from thermal neutrons.

Although one specific embodiment has been shown of the apparatus for practicing the present invention, it is to be understood that modifications and changes can be made without departing therefrom, and all such modifications falling within the scope of the appended claims are intended to be included therein.

I claim:

1. Apparatus for identifying unknown constituent elements of earth formations traversed by a well bore comprising a logging sonde having a substantial portion of its side wall constructed of material having an average thermal neutron-capture cross-section not exceeding about 0.2 barn, a neutron source positioned within said sonde, means for positioning a scintillation detector within said sonde at a predetermined vertical distance from said neutron source, bismuth shielding means surrounding said source and between said detector and said neutron source for shielding said detector from gamma rays emitted directly by said source and to prevent substantially the generation of neutron-capture gamma rays by said shielding means, boron shielding means surrounding said detector for excluding thermal neutrons diffused within an earth formation from entering said detector, additional bismuth shielding means surrounding said detector to exclude low-energy gamma rays from said detector, electrical signal generating means in said sonde for converting the energy of neutron-capture gamma rays entering said detector to an electrical signal proportional in magnitude to the energy of each of said neutron-capture gamma rays, cable means for traversing said sonde through a well bore, and means for recording the frequency of repetition in a given time of a plurality of said electrical signals in accordance with the depth of said sonde in the well bore.

2. Apparatus for identifying unknown constituent elements by their neutron-capture gamma rays arising from an earth formation traversed by a well bore while said formation is being irradiated by a fast neutron source comprising a logging sonde having at least a portion of its side wall constructed of a metal selected from the group consisting of aluminum and magnesium, a fast neutron source positioned in said sonde opposite said portion of said side wall, means for positioning a gamma ray energy detector within said sonde a predetermined vertical distance from said neutron source and opposite said side wall portion, bismuth shield means surrounding said source and between said neutron source and said detector for shielding said detector from gamma rays emitted by said source and an additional bismuth shield means between said side wall and said detector for shielding said detector from low-energy gamma rays generated by thermal neutron-capture in nuclei of elements in and around said sonde, said gamma ray detector comprising a scintillation crystal of thallium-activated sodium iodide, boron shield means intermediate said crystal and said additional bismuth shield means for shielding said detector from thermal neutrons diffused within an earth formation, means for converting the energy dissipated by neutron-capture gamma rays, emitted by nuclei of elements in an excited state within said earth formation due to the capture of thermal neutrons from said source by constituent nuclei of the formation, to an electrical signal proportional in magnitude to said dissipated energy, cable means for traversing said sonde through a well bore, and means for recording in accordance with the depth of said sonde in a well bore the frequency of repetition in a given time of the electrical signals representing the number of neutron-capture gamma rays having characteristic energies related to the amount of a constituent element in said formation.

3. Apparatus in accordance with claim 2 in which said side wall portion is substantially aluminum.

4. Apparatus in accordance with claim 2 in which said side wall portion is substantially magnesium.

References Cited in the file of this patent

UNITED STATES PATENTS

| 2,752,504 | McKay | June 26, 1956 |
| 2,769,915 | Tittle | Nov. 6, 1956 |
| 2,769,918 | Tittle | Nov. 6, 1956 |